US010647213B2

(12) United States Patent
Otoguro et al.

(10) Patent No.: US 10,647,213 B2
(45) Date of Patent: May 12, 2020

(54) VEHICLE LOWER STRUCTURE

(71) Applicant: TOYOTA JIDOSHA KABUSHIKI KAISHA, Aichi-ken (JP)

(72) Inventors: Kazuma Otoguro, Toyota (JP); Shigeyuki Inoue, Toyota (JP); Hirotaka Watanabe, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/281,100

(22) Filed: Feb. 21, 2019

(65) Prior Publication Data

US 2019/0263276 A1 Aug. 29, 2019

(30) Foreign Application Priority Data

Feb. 23, 2018 (JP) ................. 2018-030235

(51) Int. Cl.
  *B60K 1/04* (2019.01)
  *B62D 21/03* (2006.01)
  *B62D 25/20* (2006.01)
  *B62D 27/02* (2006.01)
  *B60L 50/60* (2019.01)

(52) U.S. Cl.
  CPC ............... *B60L 50/66* (2019.02); *B60K 1/04* (2013.01); *B62D 21/03* (2013.01); *B62D 25/20* (2013.01); *B62D 27/02* (2013.01); *B60K 2001/0438* (2013.01)

(58) Field of Classification Search
  CPC ... B60L 50/66; B60K 1/04; B60K 2001/0438; B62D 21/03; B62D 25/20; B62D 27/02
  See application file for complete search history.

(56) References Cited

U.S. PATENT DOCUMENTS

| 4,365,681 | A | * | 12/1982 | Singh | ...................... | B60K 1/04 |
| | | | | | | 180/68.5 |
| 8,079,435 | B2 | * | 12/2011 | Takasaki | .................. | B60K 1/04 |
| | | | | | | 180/68.5 |
| 8,967,312 | B2 | * | 3/2015 | Yanagi | ..................... | B60K 1/04 |
| | | | | | | 180/68.5 |
| 2009/0145676 | A1 | * | 6/2009 | Takasaki | .................. | B60K 1/04 |
| | | | | | | 180/65.1 |
| 2015/0249240 | A1 | * | 9/2015 | Hihara | ..................... | B60K 1/04 |
| | | | | | | 180/68.5 |
| 2017/0225558 | A1 | * | 8/2017 | Newman | ................ | B62D 25/20 |
| 2018/0108890 | A1 | * | 4/2018 | Fees | ........................ | B60L 50/66 |

FOREIGN PATENT DOCUMENTS

JP          2017-196958 A          11/2017

* cited by examiner

*Primary Examiner* — Bryan A Evans
(74) *Attorney, Agent, or Firm* — Hauptman Ham, LLP

(57) ABSTRACT

A battery pack is mounted under a floor panel. A case of the battery pack includes a case tray. On an inner surface of a bottom plate of the case tray, plural internal pack crosses are provided. On an outer surface of the bottom plate of the case tray, plural external pack crosses are provided. An internal pack cross front flange is fastened to an external pack cross rear flange that is arranged in front of the internal pack cross in the vehicle longitudinal direction in a state of matching the external pack cross rear flange in the vehicle longitudinal direction. An external pack cross front flange is fastened to an internal pack cross rear flange that is arranged in front of the external pack cross in the vehicle longitudinal direction in a state of matching the internal pack cross rear flange in the vehicle longitudinal direction.

5 Claims, 9 Drawing Sheets

FIG. 3
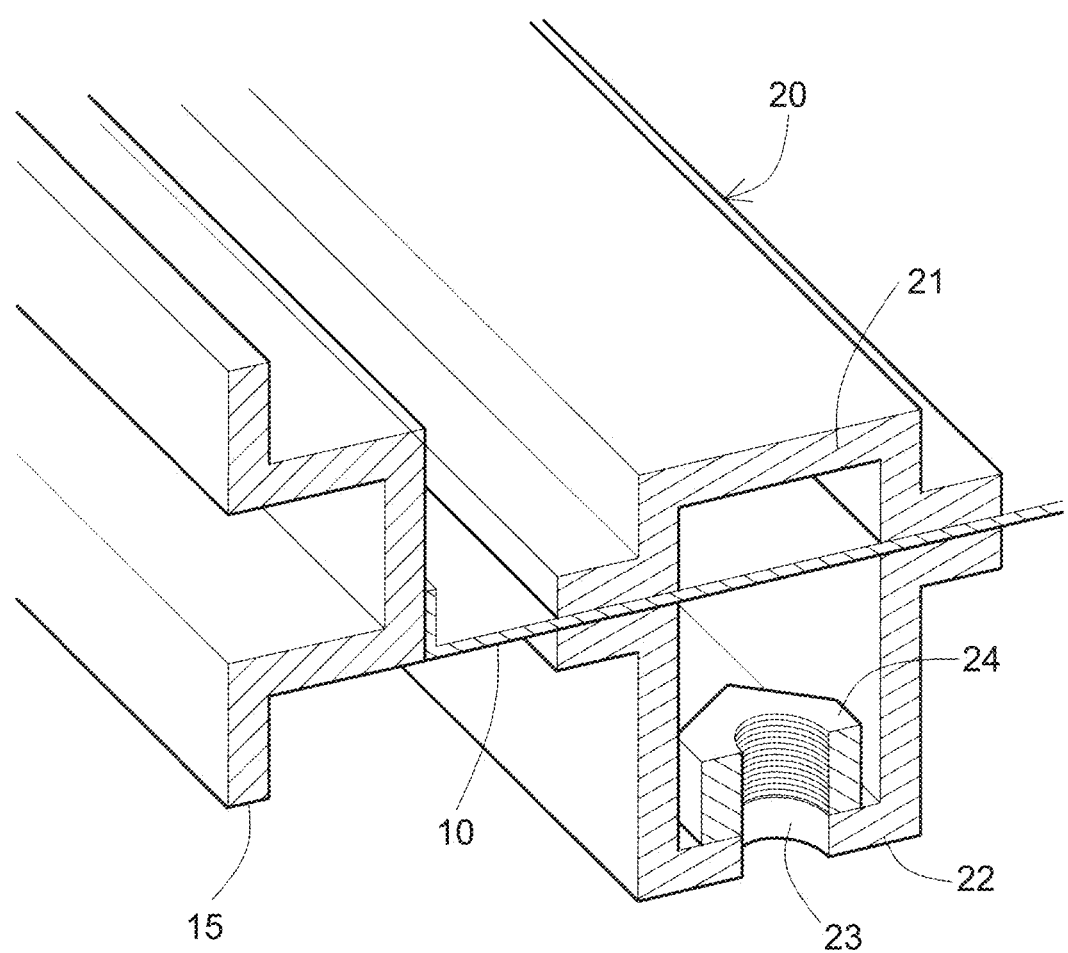
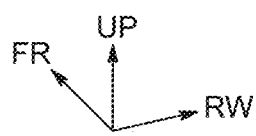

VEHICLE LOWER STRUCTURE

CROSS-REFERENCE TO RELATED APPLICATIONS

This application claims priority to Japanese Patent Application No. 2018-030235 filed on Feb. 23, 2018, which is incorporated herein by reference in its entirety.

BACKGROUND

1. Technical Field

The disclosure relates to a vehicle lower structure in which a battery is mounted under a floor of a vehicle.

2. Description of Related Art

A battery as a power supply is mounted on a vehicle such as an electric vehicle that uses a rotary electric machine as a drive source. For example, in Japanese Patent Application Publication No. 2017-196958 (JP 2017-196958 A), a battery pack is mounted under a floor (a vehicle cabin) of the vehicle.

In JP 2017-196958 A, when the battery pack is fastened to a component under a floor panel, a frame member on the floor side and a frame member on the battery pack side are fastened to each other. More specifically, as exemplified in FIG. 9, a floor cross 102 (102A, 102B) extends in a vehicle width direction (an RW-axis direction) under a floor panel 100. Meanwhile, in a case 106 of a battery pack 104, a battery cross 108 (108A, 108B) extends in the vehicle width direction. The floor cross 102 and the battery cross 108 are arranged to match each other in a vehicle longitudinal direction (an FR-axis direction) and are fastened to each other by bolts 110, nuts 112, collars 114, and the like.

In the case where the battery pack 104 is long in the vehicle longitudinal direction, for example, in the case where the battery pack 104 has a structure of extending from a position under a dash panel, which is not shown, to a position under a luggage space through positions under a front seat to a rear seat, the plural battery crosses 108A, 108B, . . . are provided along the vehicle longitudinal direction. Also, under the floor panel 100, the plural floor crosses 102A, 102B, . . . are provided along the vehicle longitudinal direction. The plural floor crosses 102 and the plural battery crosses 108 are positioned to each other along the vehicle longitudinal direction and are fastened to each other.

SUMMARY

By the way, in a vehicle lower structure that includes the fastening structure in the related art as shown in FIG. 9, there is room for improvement in torsional rigidity, that is, rigidity against a torsional load.

That is, the floor crosses 102A, 102B and the battery crosses 108A, 108B, each of which is provided along the vehicle longitudinal direction, are respectively connected by the floor panel 100 and the case 106 of the battery pack 104.

Here, in the case where the torsional load with a vehicle longitudinal axis (an FR-axis) being an axis thereof is applied, a pair of the floor cross 102A and the battery cross 108A and a pair of the floor cross 102B and the battery cross 108B oscillate about the vehicle longitudinal axis being a rotation center. In the case where such oscillation of the pair of the floor cross 102A and the battery cross 108A and such oscillation of the pair of the floor cross 102B and the battery cross 108B are asynchronous with respect to each other, the floor panel 100 and the case 106 of the battery pack 104, both of which are thin plate members respectively stretched across the floor crosses 102A, 102B and the battery crosses 108A, 108B, are deformed (bent). Just as described, in the vehicle lower structure according to the related art, there is particularly room for improvement in the torsional rigidity with the vehicle longitudinal axis (an FR-axis) being a rotational axis thereof.

The disclosure provides with a vehicle lower structure that includes a battery pack and an external pack cross. A battery pack is mounted under a floor panel. The battery pack includes plural battery stacks, a case, and an internal pack cross. The case accommodates the plural battery stacks and includes a case cover as an upper member and a case tray as a lower member. A plurality of the internal pack crosses extend in a vehicle width direction on an inner surface of a bottom plate of the case tray and are provided along a vehicle longitudinal direction. The external pack cross is a frame member that is provided in the vehicle width direction on the outside of the battery pack. A plurality of the external pack crosses are provided along the vehicle longitudinal direction on an outer surface of the bottom plate of the case tray. An internal pack cross front flange is provided at a front end in the vehicle longitudinal direction of the internal pack cross, and an internal pack cross rear flange is provided at a rear end of the internal pack cross in the vehicle longitudinal direction. An external pack cross front flange is provided at a front end in the vehicle longitudinal direction of the external pack cross, and an external pack cross rear flange is provided at a rear end of the external pack cross in the vehicle longitudinal direction. The internal pack cross front flange is fastened to the external pack cross rear flange that is arranged in front of the internal pack cross in the vehicle longitudinal direction in a state of matching the external pack cross rear flange in the vehicle longitudinal direction. The external pack cross front flange is fastened to the internal pack cross rear flange that is arranged in front of the external pack cross in the vehicle longitudinal direction in a state of matching the internal pack cross rear flange in the vehicle longitudinal direction.

According to the configuration of the vehicle lower structure as described above, the front flange of one of the external pack cross and the internal pack cross is fastened to the rear flange of the other, and the rear flange of the one is fastened to the front flange of the other. In this way, it is structured that the external pack crosses and the internal pack crosses are alternately coupled to each other along the vehicle longitudinal direction. Therefore, torsional rigidity about a vehicle longitudinal axis is improved.

In the vehicle lower structure, the internal pack cross front flange, the external pack cross rear flange that is arranged in front of the internal pack cross in the vehicle longitudinal direction, and the bottom plate of the case tray interposed between the internal pack cross front flange and the external pack cross rear flange may be fastened in a vehicle height direction by a bolt and a nut. In addition, the external pack cross front flange, the internal pack cross rear flange that is arranged in front of the external pack cross in the vehicle longitudinal direction, and the bottom plate of the case tray interposed between the external pack cross front flange and the internal pack cross rear flange may be fastened in the vehicle height direction by a bolt and a nut.

According to the configuration of the vehicle lower structure as described above, the external pack cross and the internal pack cross are alternately coupled by the bolt and the nut along the vehicle longitudinal direction while reliably securing the high rigidity. Therefore, the torsional rigidity about the vehicle longitudinal axis is improved.

In the vehicle lower structure, the internal pack cross front flange, the external pack cross rear flange that is arranged in front of the internal pack cross in the vehicle longitudinal direction, and the bottom plate of the case tray interposed between the internal pack cross front flange and the external pack cross rear flange may be joined by spot welding. In addition, the external pack cross front flange, the internal pack cross rear flange that is arranged in front of the external pack cross in the vehicle longitudinal direction, and the bottom plate of the case tray interposed between the external pack cross front flange and the internal pack cross rear flange may be joined by the spot welding.

According to the configuration of the vehicle lower structure as described above, the external pack cross and the internal pack cross are alternately coupled by the spot welding along the vehicle longitudinal direction while reliably securing the high rigidity. Therefore, the torsional rigidity about the vehicle longitudinal axis is improved.

In the vehicle lower structure, each of the battery stacks may be fastened to a pair of the internal pack crosses that are provided on front and rear sides of the corresponding battery stack in the vehicle longitudinal direction.

There is a case where each of the battery stacks has a highly rigid structure so as to be able to endure a collision load during a collision of a vehicle. In such a case, as in the vehicle lower structure, each of the battery stacks is fastened onto the paired internal pack crosses on the front and rear sides of the corresponding battery stack in the vehicle longitudinal direction. In this way, relative displacement of the paired internal pack crosses is suppressed.

In the vehicle lower structure, a front side member as a frame member may extend in the vehicle longitudinal direction on each side of the floor panel in the vehicle width direction. In this case, both ends in the vehicle width direction of the external pack cross may be bulged to outer sides of both ends in the vehicle width direction of the case, and both of the ends in the vehicle width direction of the external pack cross and the front side member may be fastened.

According to the configuration of the vehicle lower structure as described above, the external pack cross is fastened to the front side member. Therefore, relative displacement between the external pack crosses is suppressed by the front side member.

As described above, according to the configuration of the vehicle lower structure of the aspects of the disclosure, the torsional rigidity about the vehicle longitudinal axis as a rotational axis can be improved in comparison with the torsional rigidity in the related art.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an enlarged perspective view of a portion indicated by a one-dot chain circle in FIG. 2;

DETAILED DESCRIPTION OF EMBODIMENTS

A description will be made on a vehicle lower structure according to this embodiment with reference to FIG. 1 to FIG. 8. Note that, in FIG. 1 to FIG. 8, a vehicle front-rear direction (hereinafter appropriately described as a vehicle longitudinal direction) is indicated by an axis denoted by a reference symbol FR, a vehicle width direction (hereinafter appropriately described as a vehicle width direction) is indicated by an axis denoted by a reference symbol RW, and a vertical direction (hereinafter appropriately described as a vehicle height direction) is indicated by an axis represented by a reference symbol UP. The reference symbol FR is an abbreviation for Front, and a vehicle longitudinal axis FR has the vehicle front direction as a positive direction. The reference symbol RW is an abbreviation for Right Width, and a vehicle width axis RW has a vehicle width right direction as a positive direction. In addition, a vehicle height axis UP has an upward direction as a positive direction.

Figure 1:
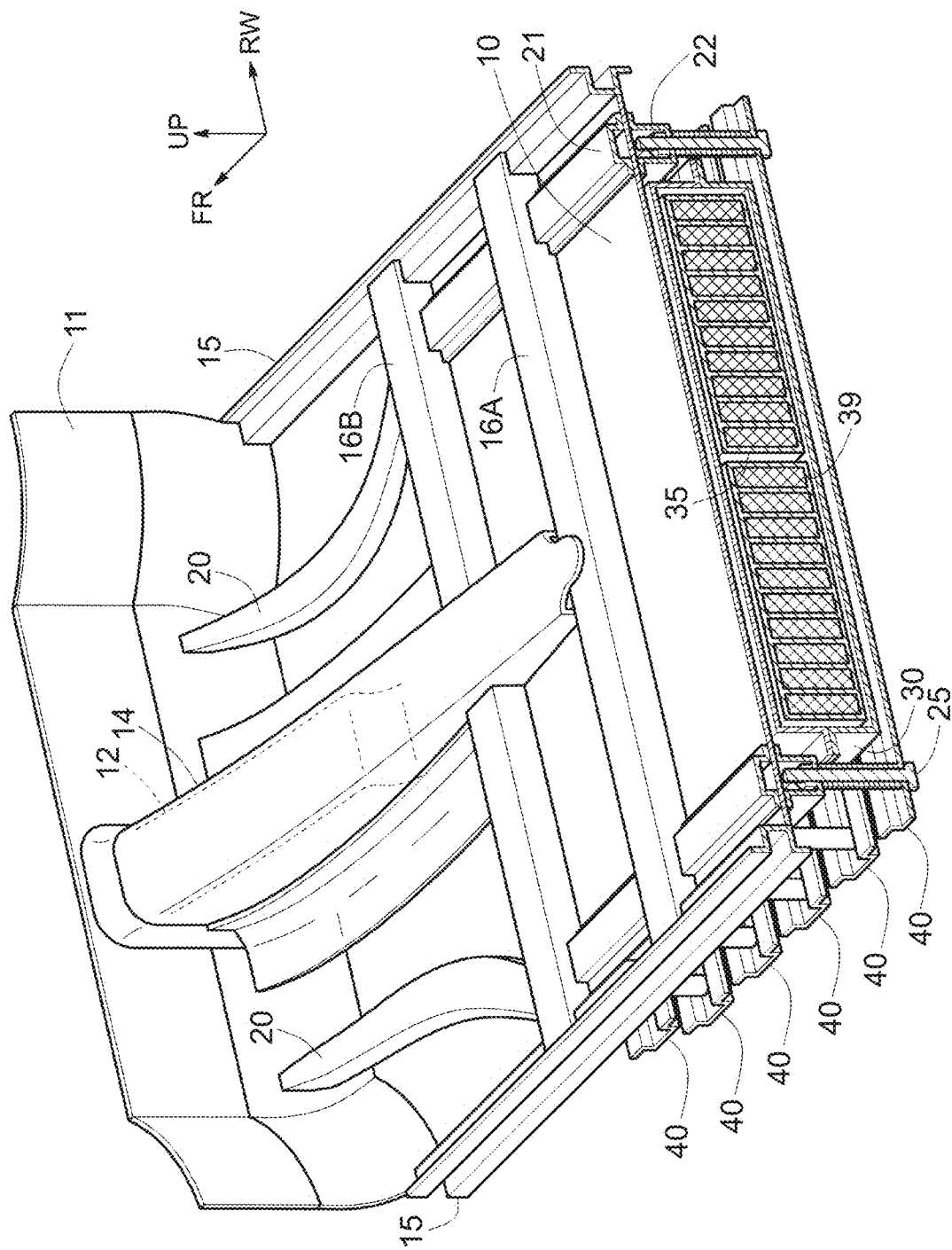
FIG. 1 is a partial perspective cross-sectional view that exemplifies a vehicle lower structure according to an embodiment of the disclosure.
Figure 2:
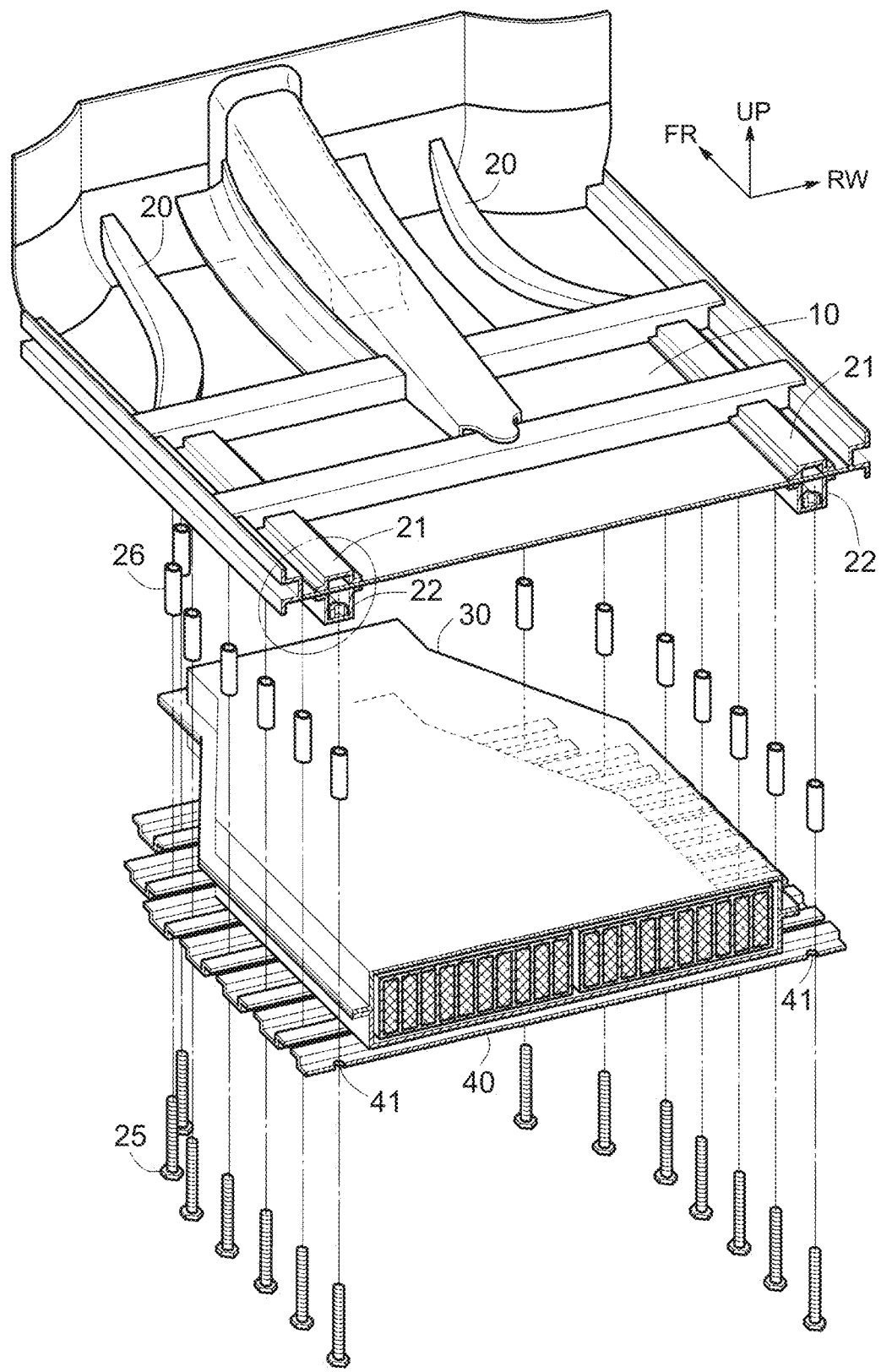
FIG. 2 is a partial cross-sectional exploded perspective view that exemplifies the vehicle lower structure according to the embodiment.

FIG. 1 exemplifies a partial perspective cross-sectional view of the vehicle lower structure according to this embodiment. FIG. 2 exemplifies an exploded perspective view of FIG. 1. Both in FIG. 1 and FIG. 2, a front portion of the vehicle lower structure is shown. The vehicle lower structure according to this embodiment is mounted on an electric vehicle, for example.

The vehicle lower structure according to this embodiment includes a floor panel 10, front side members 20, a battery pack 30, and external pack crosses 40.

The floor panel 10 is a panel member that constitutes a floor plate of a vehicle cabin. A front end of the floor panel 10 is connected to a dash panel 11. A floor tunnel 12 is provided in a central portion in the vehicle width direction of the front end of the floor panel 10.

The floor tunnel 12 is arranged from a front end of the vehicle cabin to the rear. The floor tunnel 12 is projected upward from the floor panel 10. A front end of the floor tunnel 12 is connected to the dash panel 11. As indicated by broken lines in FIG. 1, height (tunnel height) of an upper wall as a roof of the floor tunnel 12 (a tunnel root) from a floor surface (a floor panel upper surface) is gradually lowered to the rear, and a rear end of the upper wall is connected to the floor panel 10.

In the case where an internal combustion engine is mounted as a drive source of the vehicle, an exhaust pipe extends in the floor tunnel 12. However, in the case where the vehicle is the electric vehicle on which the internal combustion engine is not mounted and the battery pack 30 is accommodated under the floor as exemplified in FIG. 1, peripheral equipment of the battery pack 30 such as a battery control unit (not shown) that manages and monitors electricity of the battery pack 30 is accommodated in the floor tunnel 12.

In addition, differing from the case where the exhaust pipe extends in the floor tunnel 12, in the electric vehicle, the floor tunnel 12 does not have to extend to the rear of the vehicle. Accordingly, for example, as exemplified in FIG. 1, length of the floor tunnel 12 in the vehicle longitudinal direction may be set to such length that a rear end of the floor tunnel 12 is located in front of a first floor cross 16A.

A tunnel reinforce 14 is provided as a reinforcing member that covers the floor tunnel 12 indicated by the broken lines in FIG. 1. The tunnel reinforce 14 is formed to have higher rigidity than the floor tunnel 12. Similar to the floor tunnel 12, the tunnel reinforce 14 is projected upward from the floor panel 10 and extends in the vehicle longitudinal direction.

In addition, as frame members and reinforcing members, each of which provides the rigidity for the floor, in addition to the tunnel reinforce 14, rockers 15, the first floor cross 16A, a second floor cross 16B, and the front side members 20 are provided on the floor panel 10.

The paired rockers 15, 15 are provided at both ends in the vehicle width direction of the floor panel 10. The rockers 15, 15 extend in the vehicle longitudinal direction. Furthermore, the first floor cross 16A and the second floor cross 16B are provided in the vehicle width direction in such a manner as to connect the paired rockers 15, 15.

The front side members 20, 20 are provided on both sides in the vehicle width direction of the floor panel 10. More specifically, each of the front side members 20, 20 is provided between corresponding one of the rockers 15, 15 and the floor tunnel 12 along the vehicle longitudinal direction.

The front side members 20, 20 extend along the vehicle longitudinal direction from a bumper reinforcement (not shown) at the front end of the vehicle. The front side members 20, 20 are then bent downward at the rear of front wheels and reach the floor panel 10. On the floor panel 10, the front side members 20, 20 extend in the vehicle longitudinal direction and are coupled to rear side members, which are not shown.

A region indicated by a one-dot chain circle in FIG. 2 is shown as an enlarged view in FIG. 3. Note that, although the one-dot chain circle is drawn for the front side member 20 on a left side in the vehicle width direction in FIG. 2, the front side member 20 on a right side in the vehicle width direction also has a similar structure thereto.

Each of the front side members 20 is configured to include a front side member upper 21 and a front side member lower 22 that hold the floor panel 10 therebetween in the vehicle height direction. The front side member upper 21 and the front side member lower 22 both have hat-shaped cross sections, and form a closed cross section structure when opened ends thereof abut each other.

As exemplified in FIG. 3, a bottom wall of the front side member lower 22 is formed with an opening 23 that penetrates the bottom wall in the vehicle height direction. Furthermore, a weld nut 24 is provided in such a manner as to that a center axis of this opening 23 and a screw axis become coaxial. Plural pairs of these opening 23 and weld nut 24 are provided along a longitudinal direction of each of the front side members 20 (the vehicle longitudinal direction). More specifically, the same number of the openings 23 and the weld nuts 24 as the external pack crosses 40 are provided at the bottom wall of each of the front side member lowers 22, 22.

As shown in FIG. 2, a bolt 25 is screwed to each of the weld nuts 24. Each of the bolts 25 is also inserted through an opening 41 that is formed at each end in the vehicle width direction of the external pack cross 40. Accordingly, both of the ends in the vehicle width direction of the plural external pack crosses 40 are fastened to the front side members 20, 20 via the weld nuts 24 and the bolts 25. In this way, relative displacement of the plural external pack crosses 40 is suppressed by the front side members 20, 20, and thus torsion between the external pack crosses 40, 40 is suppressed.

Figure 4:
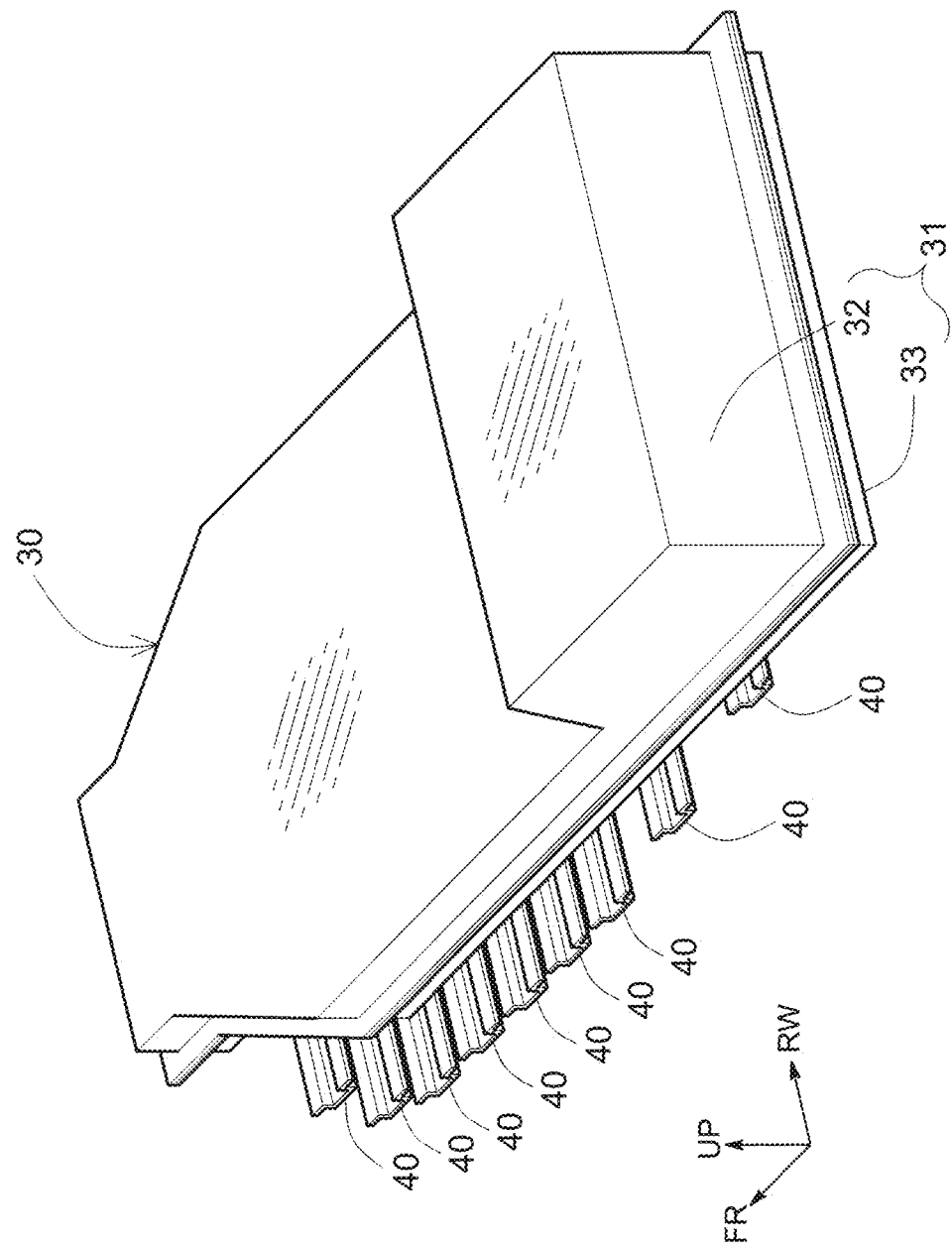
FIG. 4 is a perspective view that exemplifies a battery pack and external pack crosses in the vehicle lower structure.

FIG. 4 exemplifies an entire perspective view of the battery pack 30. The battery pack 30 is mounted under the floor panel 10. An upper surface of the battery pack 30 is formed along an opposing floor shape. For example, the battery pack 30 is formed such that the upper surface on a rear side is higher along the vehicle height direction than the upper surface on a front side. The battery pack 30 is formed along a rear structure of the vehicle. More specifically, a rear portion of the battery pack 30 is formed in a shape that corresponds to a so-called kick structure in which the rear side members (not shown) are bent upward and then extend to the rear in the vehicle longitudinal direction.

Figure 5:
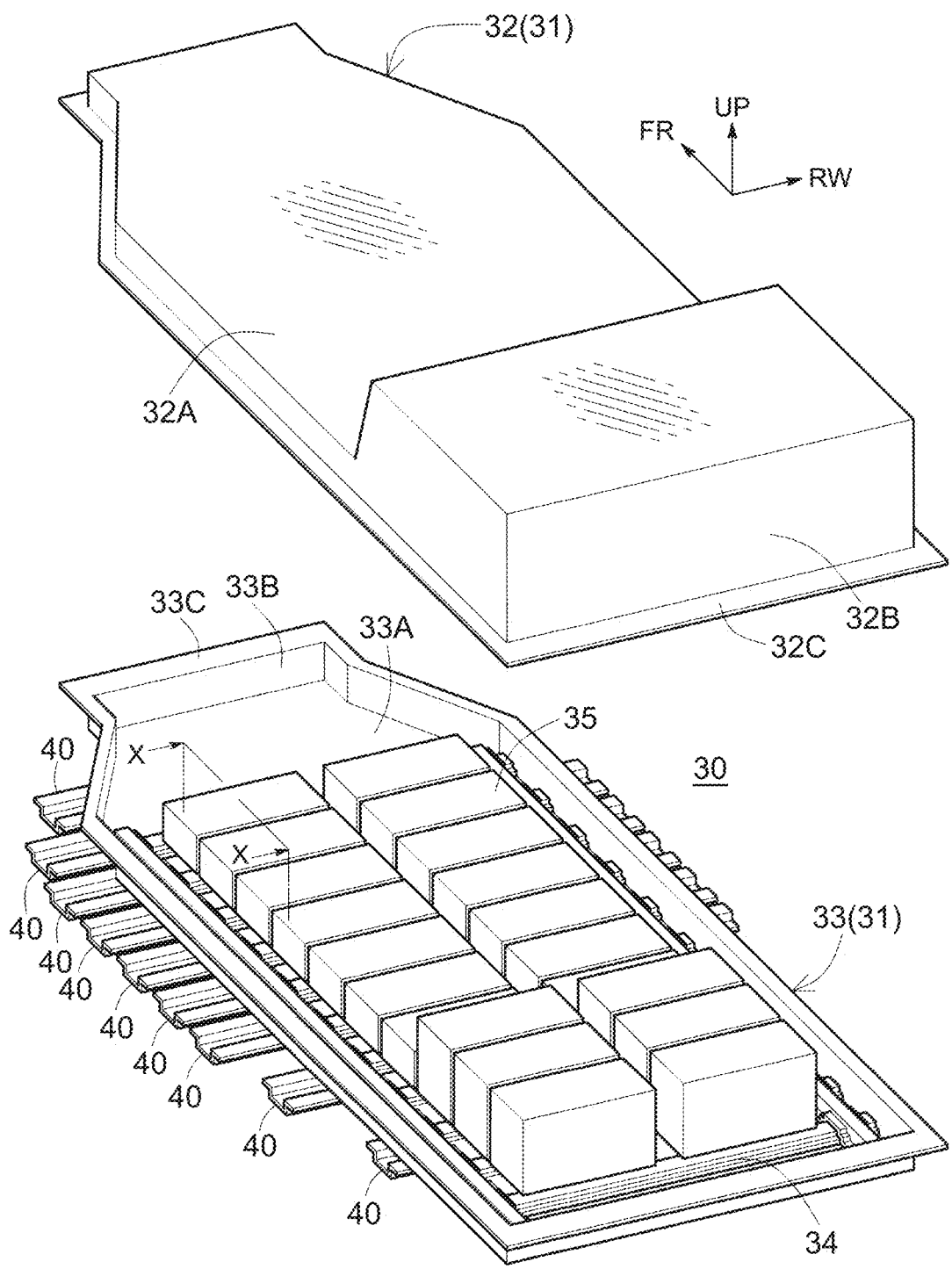
FIG. 5 is an exploded perspective view for illustrating the inside of the battery pack.

FIG. 5 exemplifies an exploded perspective view of the battery pack 30. The battery pack 30 is configured to include a case 31 (a case cover 32 and a case tray 33), an internal pack cross 34, and a battery stack 35.

The plural battery stacks 35 are accommodated in the case 31. Plural battery cells 39 (see FIG. 1) are stacked in the single battery stack 35. Each of the battery cells 39 is constructed of a nickel-metal hydride secondary battery, a lithium-ion secondary battery, an all-solid battery, or the like, for example.

A rigid member such as an end plate protects the outside of a stacked body of the battery cells 39. Due to such a protection structure, each of the battery stacks 35 has such rigidity that the battery stack 35 can endure a load of approximately 1 to 5 t, for example.

The case 31 is a casing that accommodates the plural battery stacks 35 and includes the case cover 32 as an upper member and the case tray 33 as a lower member. Each of the case cover 32 and the case tray 33 is formed of a thin metal plate member such as an aluminum panel.

The case cover 32 includes: an upper plate 32A that extends in a substantially horizontal direction; and a lateral plate 32B that is connected to a peripheral edge of the upper plate 32A and extends downward. Furthermore, at a lower end of the lateral plate 32B, a connection flange 32C that connects the lateral plate 32B to the case tray 33 is provided.

The case tray 33 is substantially formed in a ship shape. The case tray 33 includes: a bottom plate 33A that extends in the substantially horizontal direction; and a lateral plate 33B that is connected to a peripheral edge of the bottom plate 33A and extends upward. Furthermore, at an upper end of the lateral plate 33B, a connection flange 33C that is connected to the connection flange 32C of the case cover 32 is provided.

Figure 6:
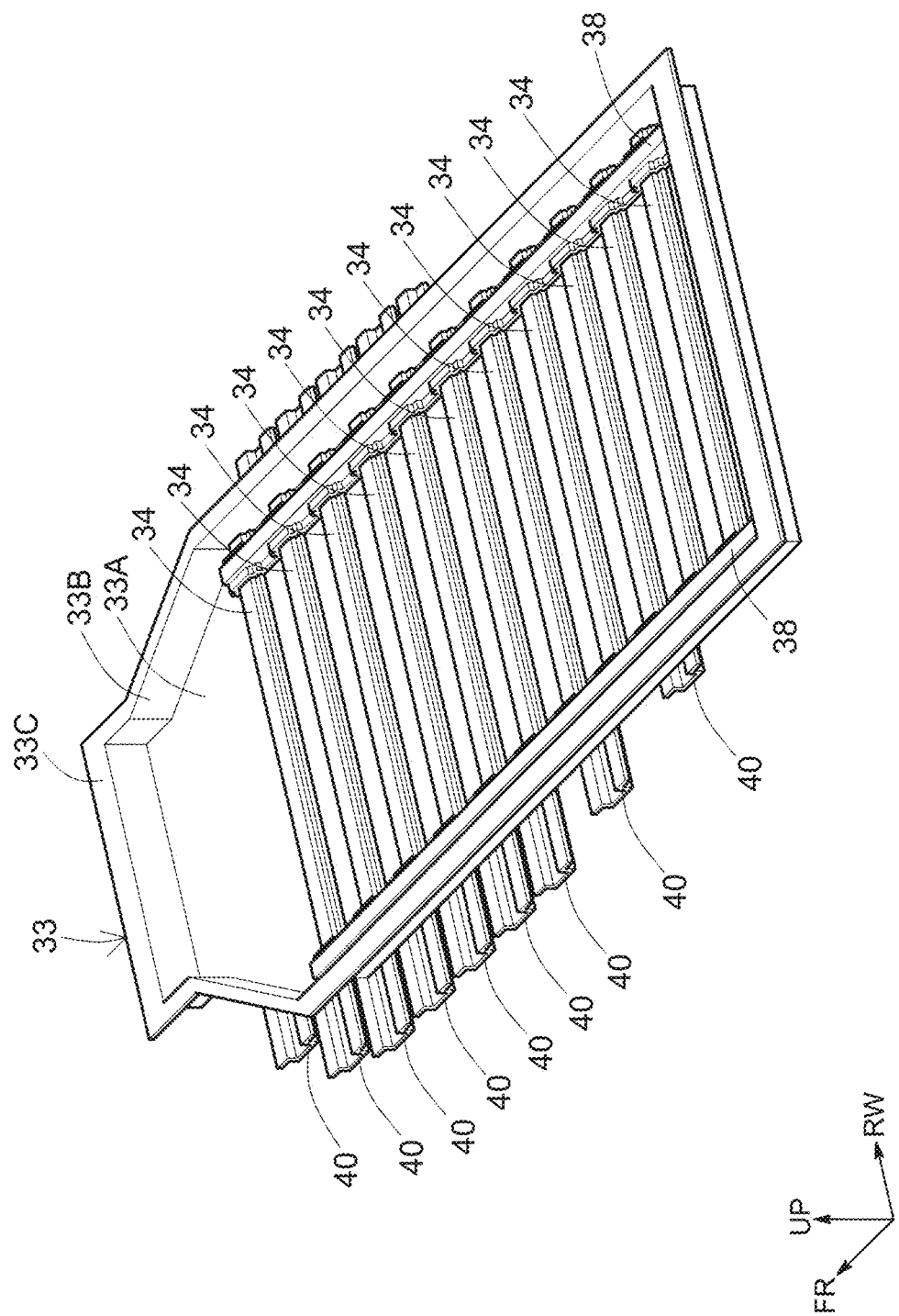
FIG. 6 is a perspective view for illustrating a structure of a case tray shown in FIG. 4.

FIG. 6 exemplifies a view at the time when the battery stacks 35 are removed from the case tray 33. On an inner surface (an upper surface) of the bottom plate 33A of the case tray 33, the plural internal pack crosses 34 are provided along the vehicle longitudinal direction. Each of the internal pack crosses 34 is a frame member that protects the battery pack 30 and extends in the vehicle width direction between the lateral plates 33B, 33B at both ends in the vehicle width direction of the case tray 33. In addition, both ends in the vehicle width direction of the plural internal pack crosses 34 are coupled by internal pack reinforces 38, 38 as reinforcing members.

Figure 8:
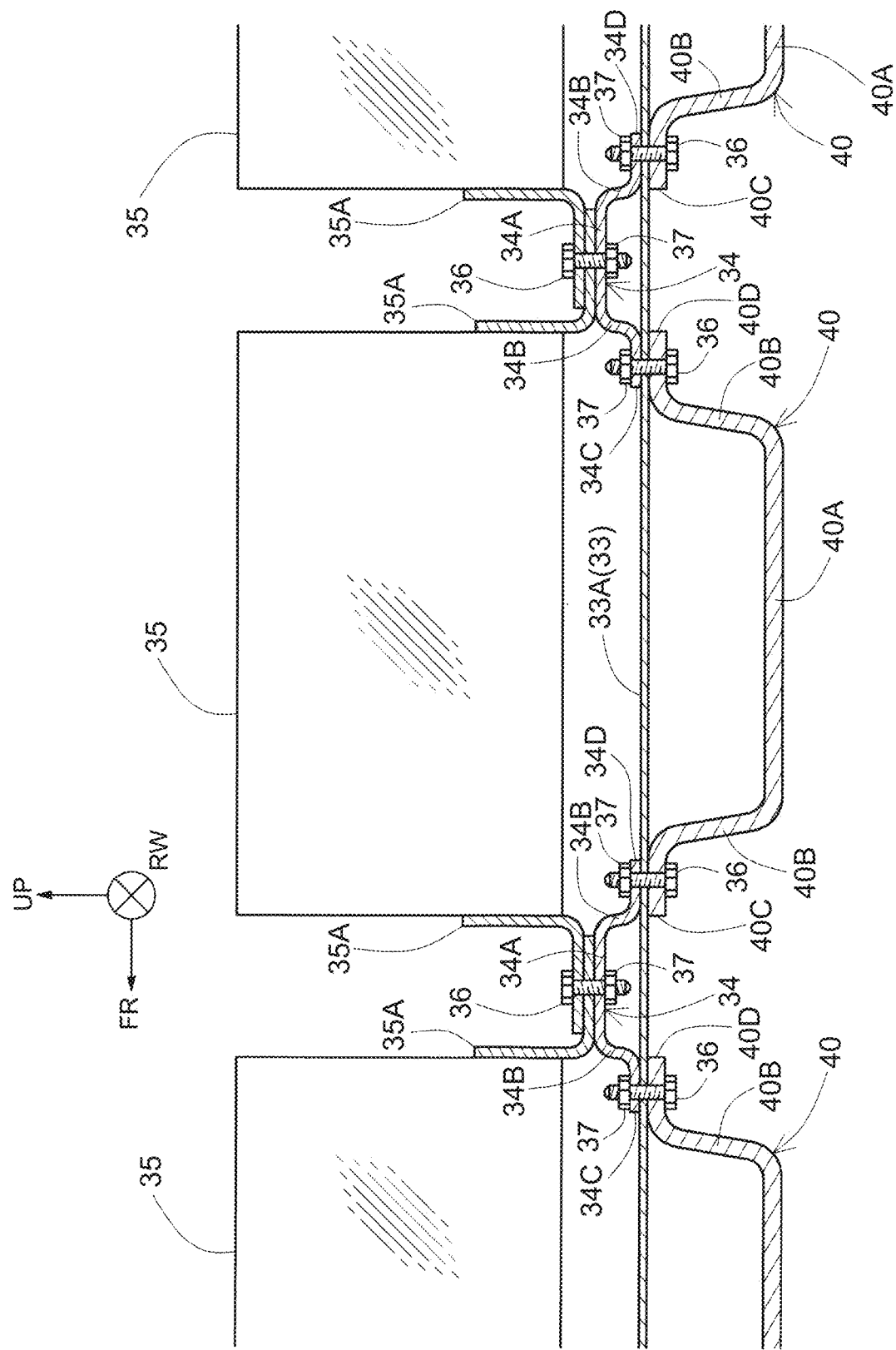
FIG. 8 is a view that exemplifies a cross-sectional side view that is taken along X-X in FIG. 5.
Figure 9:
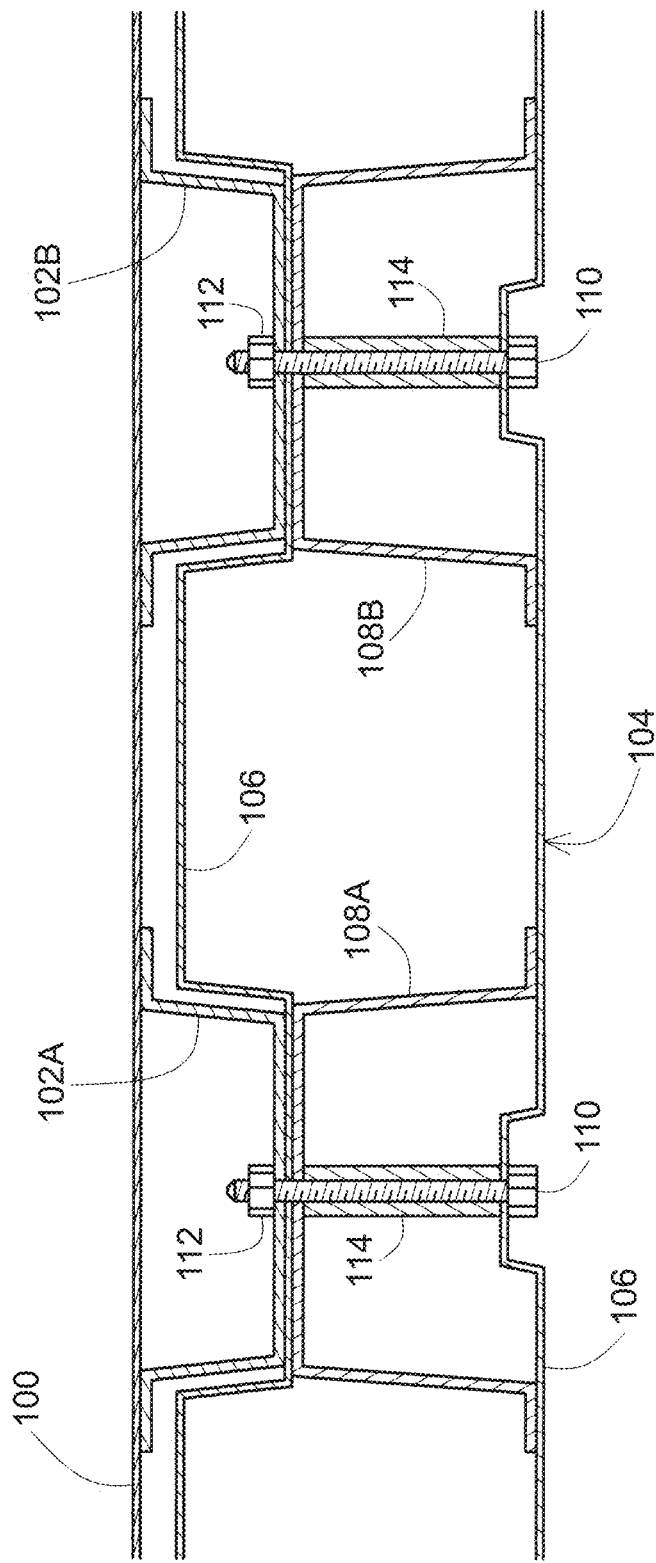
FIG. 9 is a side cross-sectional view that exemplifies a vehicle lower structure according to the related art.

With reference to FIG. 8, each of the internal pack crosses 34 has a hat shape in a side view and includes an upper wall 34A and a lateral wall 34B. The upper wall 34A extends horizontally. The lateral wall 34B is connected to each of front and rear ends of the upper wall 34A and extends downward. Furthermore, each of the internal pack crosses 34 includes, as portions corresponding to a brim of the hat shape, a front flange 34C at the front end in the vehicle longitudinal direction and a rear flange 34D at the rear end in the vehicle longitudinal direction.

As will be described below, the front flange 34C of the internal pack cross 34 is fastened to a rear flange 40D of the external pack cross 40. In addition, the rear flange 34D of the internal pack cross 34 is fastened to a front flange 40C of the external pack cross 40. Due to such a fastening structure, the internal pack cross 34 and the external pack cross 40 as the frame members are coupled to each other along the vehicle longitudinal direction. Thus, rigidity of each of the internal pack cross 34 and the external pack cross 40 against the torsional load about a vehicle longitudinal axis is improved.

On the inner surface of the bottom plate 33A of the case tray 33, the plural internal pack crosses 34 are provided at spaced intervals along the vehicle longitudinal direction. Each of these arrangement intervals is set to be equal to length in the vehicle longitudinal direction of a lower wall 40A of the external pack cross 40, for example.

Figure 7:
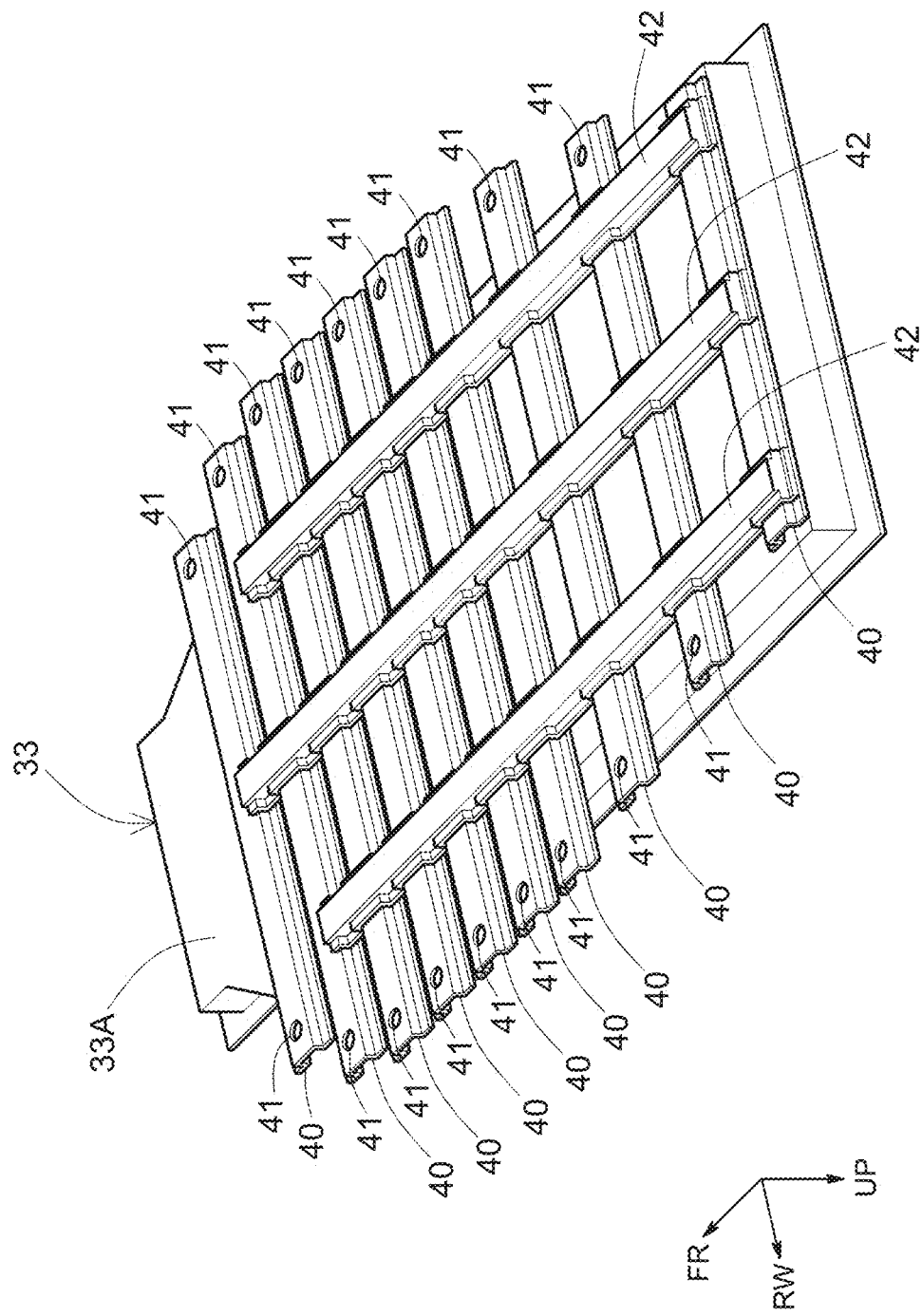
FIG. 7 is a perspective view that exemplifies FIG. 6 at a vertically reverse angle.

FIG. 7 exemplifies the case tray 33 in FIG. 6 at a vertically reverse angle. On an outer surface (a lower surface) of the bottom plate 33A of the case tray 33, the external pack crosses 40 are provided.

The external pack crosses 40 are the frame members that protect the battery pack 30 with the internal pack crosses 34, are provided on the outside of the battery pack 30, and extend in the vehicle width direction. In addition, in order to receive an obstacle (a barrier) that attempts to access the battery pack 30 from a side before the obstacle reaches the battery pack 30 during a lateral collision of the vehicle, the external pack crosses 40 are formed such that both of the ends thereof in the vehicle width direction are bulged to outer sides of both ends in the vehicle width direction of the case 31.

Note that, as exemplified in FIG. 7, because rear wheels are arranged on outer sides of the rearmost external pack cross 40 in the vehicle longitudinal direction, the rearmost external pack cross 40 may not be bulged to outer sides of the battery pack 30 in the vehicle width direction. For example, length in the vehicle width direction of the rearmost external pack cross 40 in the vehicle longitudinal direction may be substantially the same as length in the vehicle width direction of the battery pack 30.

The opening 41 that penetrates the external pack cross 40 in the vehicle height direction is provided at each of the ends of the external pack cross 40 in the vehicle width direction. The bolt 25 shown in FIG. 2 is inserted through each of these openings 41. Each of the bolts 25 is inserted through a collar 26 and the opening 23 (see FIG. 3) of the front side member lower 22. Furthermore, each of the bolts 25 is screwed to the weld nut 24, which is provided in the front side member lower 22. In this way, the external pack crosses 40 are fastened to the front side members 20.

With reference to FIG. 8, each of the external pack crosses 40 has a hat shape in the side view and includes: the lower wall 40A that extends horizontally; and a lateral wall 40B that is connected to each of front and rear ends of the lower wall 40A and extends upward. In addition, each of the external pack crosses 40 includes, as portions corresponding to a brim of the hat shape, the front flange 40C at the front end in the vehicle longitudinal direction and the rear flange 40D at the rear end in the vehicle longitudinal direction.

On the outer surface (the lower surface) of the bottom plate 33A of the case tray 33, the external pack crosses 40 are provided at spaced intervals along the vehicle longitudinal direction. Each of these arrangement intervals is set to be equal to length in the vehicle longitudinal direction of the upper wall 34A of the internal pack cross 34, for example.

These plural external pack crosses 40 are coupled by external pack reinforces 42 (see FIG. 7) as reinforcing members that extend in the vehicle longitudinal direction. For example, the external pack reinforces 42 are provided at a total of three positions that are both ends in the vehicle width direction and a center in the vehicle width direction of the bottom plate 33A of the case tray 33.

In addition, as shown in FIG. 8, the internal pack crosses 34 and the external pack crosses 40 are alternately arranged in the vehicle longitudinal direction and are fastened to each other. More specifically, the front flange 34C of the internal pack cross 34 and the rear flange 40D of the external pack cross 40 that is arranged in front of the corresponding internal pack cross 34 in the vehicle longitudinal direction match each other in the vehicle longitudinal direction. In this state, the front flange 34C of the internal pack cross 34, the rear flange 40D of the external pack crosses 40, and the bottom plate 33A of the case tray 33 interposed therebetween are fastened in the vehicle height direction by a bolt 36 and a nut 37.

Furthermore, the front flange 40C of the external pack cross 40 and the rear flange 34D of the internal pack cross 34 that is arranged in front of the corresponding external pack cross 40 in the vehicle longitudinal direction match each other in the vehicle longitudinal direction. In this state, the front flange 40C of the external pack cross 40, the rear flange 34D of the internal pack cross 34, and the bottom plate 33A of the case tray 33 interposed therebetween are fastened in the vehicle height direction by the bolt 36 and the nut 37. Note that, instead of fastening by the bolt 36 and the nut 37, the front flange 34C of the internal pack cross 34, the rear flange 40D of the external pack crosses 40, and the bottom plate 33A of the case tray 33 interposed therebetween may be joined by spot welding.

As described above, in the vehicle lower structure according to this embodiment, the external pack crosses 40 and the internal pack crosses 34 are fastened to each other in the alternately arranged state along the vehicle longitudinal direction. With such a structure, when the torsional load about the vehicle longitudinal axis is applied, the external pack cross 40 and the internal pack cross 34 that are adjacent to each other reinforce each other. Thus, deformation (torsional deformation) of the external pack cross 40 and the internal pack cross 34 is suppressed.

In addition, in the vehicle lower structure according to this embodiment, each of the battery stacks 35 is fastened onto the paired internal pack crosses 34, 34 that are provided on the front and rear sides of the corresponding battery stack 35 in the vehicle longitudinal direction. For example, a bracket 35A that is provided at each of a front end and a rear end of the battery stack 35 is arranged on the upper wall 34A of the internal pack cross 34 and is fastened by the bolt 36 and the nut 37.

As described above, each of the battery stacks 35 has load resistance performance and thus can be regarded as a rigid member. Since each of the battery stacks 35 is fastened onto the internal pack crosses 34, 34 on the front and rear sides of the corresponding battery stack 35 in the vehicle longitudinal direction, relative displacement of these internal pack crosses 34, 34 is suppressed.

Next, a description will be made on an assembling method of the vehicle lower structure. For assembly of the vehicle lower structure, the battery pack 30 is initially assembled. As exemplified in FIG. 6, the plural external pack crosses 40 and the plural internal pack crosses 34 are aligned with the case tray 33 being interposed therebetween.

More specifically, with reference to FIG. 8, the front flange 34C of each of the internal pack crosses 34 and the rear flange 40D of the external pack cross 40 that is arranged in front of the corresponding internal pack cross 34 in the vehicle longitudinal direction are fastened to each other in the vehicle height direction by the bolt 36 and the nut 37. Similarly, the front flange 40C of each of the external pack crosses 40 and the rear flange 34D of the internal pack cross 34 that is arranged in front of the corresponding external pack cross 40 in the vehicle longitudinal direction are fastened to each other in the vehicle height direction by the bolt 36 and the nut 37. Alternatively, instead of fastening by the bolt, the front flange 34C of the internal pack cross 34, the rear flange 40D of the external pack crosses 40, and the bottom plate 33A of the case tray 33 interposed therebetween may be joined by the spot welding.

Next, each of the battery stacks 35 is fastened onto the paired internal pack crosses 34, 34 that are provided on the front and rear sides of the corresponding battery stack 35 in the vehicle longitudinal direction. More specifically, the bracket 35A that is provided at each of the front end and the rear end of the battery stack 35 is arranged on the upper wall 34A of the internal pack cross 34 and is fastened by the bolt 36 and the nut 37.

Furthermore, after wires such as wire harnesses are routed to the plural battery stacks 35, with reference to FIG. 6, the case cover 32 is placed on the case tray 33, and the case 31 is closed. Next, with reference to FIG. 2 and FIG. 3, each of the bolts 25 is inserted through the opening 41 of the external pack cross 40, the collar 26, and the opening 23 of the front side member lower 22 and is further screwed to the weld nut 24. In this way, the battery pack 30 is fastened under the floor of the vehicle.

What is claimed is:

1. A vehicle lower structure comprising:
   a battery pack mounted under a floor panel, the battery pack including plural battery stacks, a case, and an internal pack cross, the case accommodating the plural battery stacks and including a case cover as an upper member and a case tray as a lower member, and a plural plurality of the internal pack crosses extending in a vehicle width direction on an inner surface of a bottom plate of the case tray and being provided along a vehicle longitudinal direction; and
   an external pack cross as a frame member that is provided in the vehicle width direction on the outside of the battery pack, a plurality of the external pack crosses being provided along the vehicle longitudinal direction on an outer surface of the bottom plate of the case tray,
   wherein an internal pack cross front flange is provided at a front end in the vehicle longitudinal direction of the internal pack cross, and an internal pack cross rear flange is provided at a rear end of the internal pack cross in the vehicle longitudinal direction,
   wherein an external pack cross front flange is provided at a front end in the vehicle longitudinal direction of the external pack cross, and an external pack cross rear flange is provided at a rear end of the external pack cross in the vehicle longitudinal direction,
   wherein the internal pack cross front flange is fastened to the external pack cross rear flange that is arranged in front of the internal pack cross in the vehicle longitudinal direction in a state of matching the external pack cross rear flange in the vehicle longitudinal direction, and
   wherein the external pack cross front flange is fastened to the internal pack cross rear flange that is arranged in front of the external pack cross in the vehicle longitudinal direction in a state of matching the internal pack cross rear flange in the vehicle longitudinal direction.

2. The vehicle lower structure according to claim 1 wherein:
   the internal pack cross front flange, the external pack cross rear flange that is arranged in front of the internal pack cross in the vehicle longitudinal direction, and the bottom plate of the case tray interposed between the internal pack cross front flange and the external pack cross rear flange are fastened in a vehicle height direction by a bolt and a nut; and
   the external pack cross front flange, and the internal pack cross rear flange that is arranged in front of the external pack cross in the vehicle longitudinal direction, and the bottom plate of the case tray interposed between the external pack cross front flange and the internal pack cross rear flange are fastened in the vehicle height direction by a bolt and a nut.

3. The vehicle lower structure according to claim 1 wherein:
   the internal pack cross front flange, the external pack cross rear flange that is arranged in front of the internal pack cross in the vehicle longitudinal direction, and the bottom plate of the case tray interposed between the internal pack cross front flange and the external pack cross rear flange are joined by spot welding; and
   the external pack cross front flange, the internal pack cross rear flange that is arranged in front of the external pack cross in the vehicle longitudinal direction, and the bottom plate of the case tray interposed between the external pack cross front flange and the internal pack cross rear flange are joined by the spot welding.

4. The vehicle lower structure according to claim 1, wherein each of the battery stacks is fastened to a pair of the internal pack crosses that are provided on front and rear sides of the battery stack in the vehicle longitudinal direction.

5. The vehicle lower structure according to claim 1, wherein:
   a front side member as a frame member extends in the vehicle longitudinal direction on each side of the floor panel in the vehicle width direction;
   both ends in the vehicle width direction of the external pack cross are bulged to outer sides of both ends in the vehicle width direction of the case; and
   both of the ends in the vehicle width direction of the external pack cross and the front side member are fastened.

* * * * *